Jan. 14, 1930.  W. LINDNER  1,743,557
COMBUSTION MOTOR DRIVEN LOCOMOTIVE AND METHOD OF OPERATING SAME
Filed Jan. 3, 1928
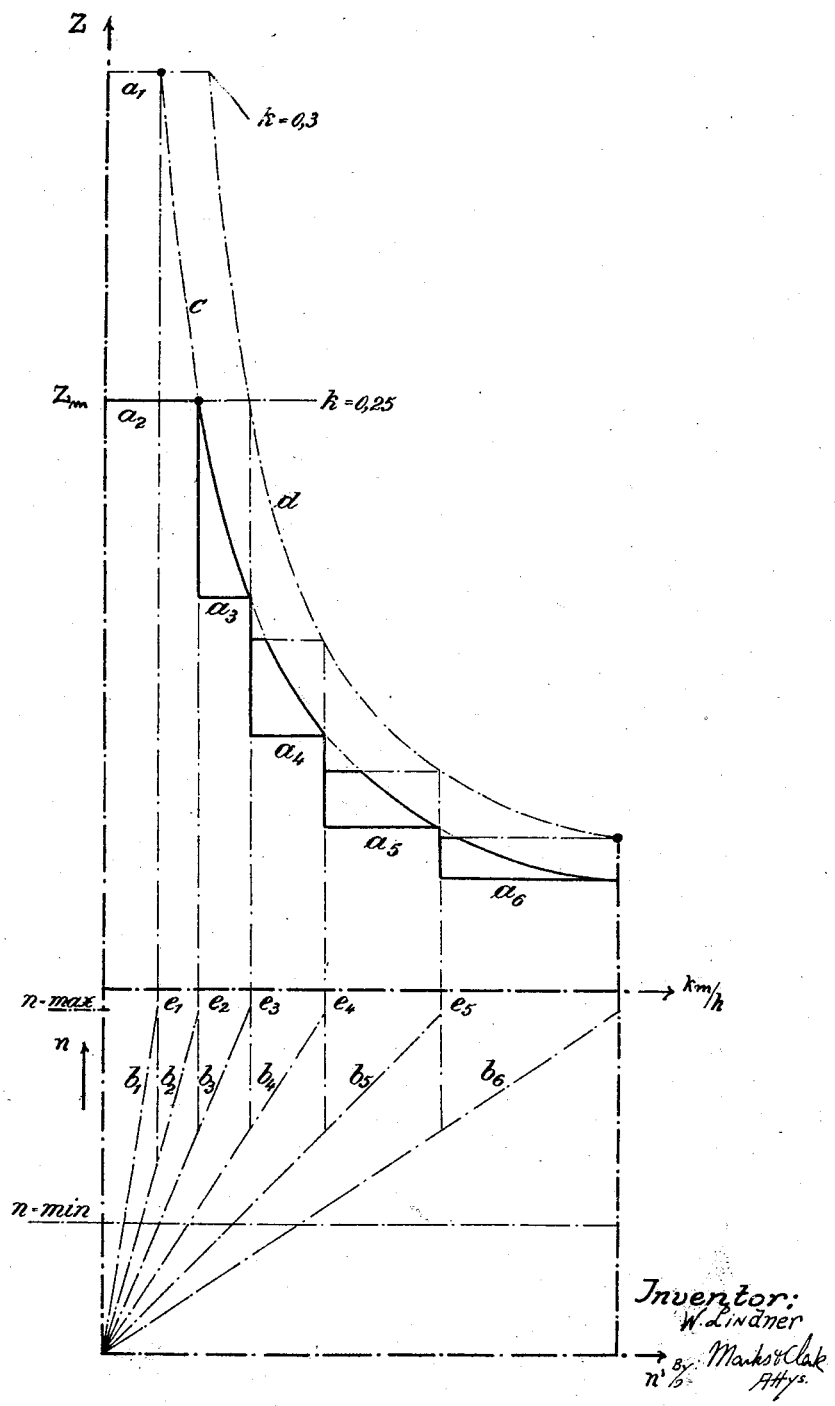

Patented Jan. 14, 1930

1,743,557

UNITED STATES PATENT OFFICE

WALTHER LINDNER, OF DUSSELDORF-GRAFENBERG, GERMANY, ASSIGNOR TO HOHEN-ZOLLERN AKTIENGESELLSCHAFT FÜR LOKOMOTIVBAU, OF DUSSELDORF-GRAFEN-BERG, GERMANY

COMBUSTION MOTOR-DRIVEN LOCOMOTIVE AND METHOD OF OPERATING SAME

Application filed January 3, 1928, Serial No. 244,350, and in Germany January 8, 1927.

My invention relates to improvements in variable-speed drives such as are used in locomotives which are driven by combustion motors in general and Diesel-motors in particular. Motors of this kind produce a speed which may only be varied within relatively small limits, and a torque which cannot essentially be increased above its normal value.

My invention relates more especially to variable speed drives of the kind mentioned, which comprise a plurality of pairs of cog-wheels, of which each pair serves for producing one speed, said cog-wheels being mounted one fixedly and the other loosely upon the respective shafts. By means of a friction coupling the loosely mounted cog-wheel may be fixedly connected with its shaft when throwing-in the desired speed.

In order to properly utilize the combustion taking place in the cylinder or cylinders of a combustion motor, a certain minimum angular velocity is required for the shaft of the combustion motor. For instance, this minimum angular velocity for Diesel-locomotives corresponds to a minimum speed of rotation $n_{min} = 300$ R. P. M., the angular velocity in this case being $w = \frac{\pi n}{30}$. At this angular velocity of the shaft of the combustion motor the latter will be in no-load condition during starting, if a Diesel-locomotive is assumed which is driven by means of a transmission gearing. By throwing-in the coupling which serves for producing the first rate of speed the train may be set in motion and its speed gradually increased by successively throwing-in the further couplings. The mininum angular velocity of the motor shaft by reason of the ratio of gearing which is produced by having the transmission gear adjusted upon the first rate of speed will correspond to a definite speed of travel of the locomotive. Considering the speed of rotation of the motor shaft on the one hand and the speed of rotation of the idle shaft of the locomotive on the other hand, the speed of rotation $n_1$ of the motor shaft will be equal to the ratio of gearing $c_1$ which is present at the first rate of speed multiplied by the speed of rotation $n'_1$ of the crank of the idle shaft. This condition may therefore be expressed by the equation $n_1 = c_1 \cdot n'_1$. Below the velocity of travel of the locomotive which velocity will correspond to speed of rotation $n'_1$, therefore, the coupling must be in sliding condition. As above stated, the motor will operate at least at a minimum speed of rotation $n_{min} = 300$ R. P. M., before the transmission gear is thrown-in at all. The torque exerted by the motor, however, will be regulable in this case. More particularly, said torque may be regulated by increasing or decreasing the admission of the cylinder, that is, the quantity of fuel introduced in the cylinder. If now a large torque is required at the idle shaft of the locomotive in order to cause the locomotive to pull, if the train consists of a great number of cars, also a large torque must be transmitted by the coupling which serves for producing the first rate of speed, and the heat produced by friction due to the long duration of the sliding condition of the coupling will result in heavy strains imposed on said coupling. In order to relieve the coupling from these heavy strains during starting of the locomotive, that is during producing the first rate of speed, special provisions are made which form part of my present invention.

The varying values of the power delivered by a steam locomotive as known may be graphically represented by an equilateral hyperbola. The ordinates of the hyperbola will represent the values of the tractive force of the locomotive, for instance, in kg., while the abscissæ of this hyperbola will indicate the velocity of travel of the locomotive, for instance, in km. per hour. This hyperbola is limited towards above by a line indicating the frictional tractive force of the locomotive, this frictional tractive force $Z_m$ being determined by the equation: $Z_m = kP$, $k$ being the coefficient of adhesive friction of the locomotive which coefficient is equal to about 0.25 and P denoting the weight of the locomotive. In case of employing a combustion motor driven locomotive with a transmission gearing, no such hyperbola may be exactly attained as is the case in steam locomotives. In order to attain, therefore, that the curve which indicates the tractive forces of a combustion motor driven locomotive in dependence from the speed of travel of the locomotive, will resemble as closely as possible to the above-mentioned hyperbola of the steam locomotive, a relatively great number of rates of speed must be provided in the transmission gearing forming part of the combustion motor driven locomotive. The provision of a greater number of rates of speed in the transmission gearing of a combustion motor driven locomotive will have the result that a rate of speed which may be obtained by means of a greater ratio of gearing will correspond to a smaller velocity of travel of the locomotive at a maximum speed of rotation of the motor, than in case of a smaller ratio of gearing.

If, therefore, a curve is drawn which indicates the speed of rotation of the locomotive, or more properly the speed of rotation of its driving axles in dependence from the speed of the combustion motor, this curve $b$ will descend more steeply and may be represented by the equation $n = $ function $(n')$ wherein $n$ denotes the speed of rotation of the motor and $n'$ the speed of rotation of the locomotive axles. A stepped line will therefore be obtained, the ordinates of said line representing the speeds of rotation of the motor and the abscissæ the speed of rotation of the idle shaft of the locomotive, the speed of rotation of the latter being obtained by the respective rates of speed obtainable with the transmission gearing. The speed-curves are limited in this case towards above by the maximum speed of the motor. It may be noted that the coupling member which is connected with the motor will rotate in this case at a definite speed, while the other coupling member will be gradually brought into synchronism with said former coupling member after throwing-in the coupling. By reason of the fact that the speed curve descends more steeply, the point of intersection of said curve with the curve indicating the minimum speed of the motor will be moved more closely to the point indicating the synchronism between the two members of the coupling.

A definite velocity of travel of the locomotive on the axis of abscissæ will therefore correspond to this point of intersection of the two curves $b$ and $n_{min}$, and there will be no more sliding of the respective coupling at this point. Since, however, a definite time is required for the locomotive in order to assume its proper velocity of travel, the distances between the points of synchronism of the several speed-curves will immediately indicate the times during which the respective coupling is in sliding condition.

At the present time the several rates of speed in the transmission gearing of Diesel-locomotives are so choosen, that during throwing-in the first speed the ratio of transmission is such that the tractive force will be slightly smaller, than the above-mentioned frictional tractive force $Z_m = k \cdot P$. This had been done because a still greater ratio of transmission had been regarded as useless, as a greater tractive force could not be obtained by a greater ratio of transmission on account of the sliding of the driving wheels of the locomotive. The number of speeds is chosen in accordance with the type of locomotive and the purpose of use, and the several speeds of the transmission gear are ordinarily so chosen that they will follow a geometrical series. In general for locomotives for passenger trains four speeds are used, the speed produced by the smallest ratio of transmission corresponding to the maximum velocity of the locomotive in normal service.

The accompanying drawing represents a diagram for the tractive force of a steam locomotive said diagram showing the above-mentioned hyperbola which indicates the tractive force of the locomotive in dependence from its velocity of travel, said hyperbola being limited towards above by a line indicating the adhesive force of the locomotive and towards below the maximum velocity of travel. In order to obtain with a combustion motor driven locomotive a curve for the tractive force which curve at least approximates said hyperbola of the steam locomotive, the transmission gearing is arranged for a plurality of speeds or rates of speed. For the stepped line which is shown below the curve for the tractive force the lines $b_1$, $b_2$, $b_3$, $b_4$, $b_5$ and $b_6$ represent the several speeds of rotation of the motor attainable by the several rates of speeds of the transmission gearing in dependence from the velocity of travel of the locomotive, that is in dependence from the speed of rotation of the idle shaft. The hyperbola $c$ which indicates the power of the motor during normal operation and the hyperbola $d$ which indicates the power of the motor in overload condition of the latter (which is due to a greater admission of fuel to the cylinders) will determine the tractive forces of the locomotive during the several rates of gearing $a_2$, $a_3$, $a_4$, $a_5$ and $a_6$ by the points of intersection of the vertical lines $e_2$, $e_3$, $e_4$, $e_5$ and $e_6$ with the respective hyperbola $c$ or $d$, said points of intersection representing the speed of the motor which corresponds to the respective power of the motor. Since the maximum tractive force $a_2$ of the locomotive is determined by the adhesive weight of the latter, the course of the curve for the tractive force which curve is determined by $a_3$, $a_4$, $a_5$ and $a_6$ will approximately follow said hyperbola, this being due to the ability of the combustion motor of easily operating in overload condition. The stepped line $a_3$, $a_4$, $a_5$ and $a_6$ will terminate into the straight line $a_2$ which is determined by the maximum frictional tractive force of the locomotive. While the power of the motor is being fully utilized in order to generate the tractive forces $a_3$, $a_4$, $a_5$ and $a_6$, this is not the case on the branch of the hyperbola which indicates the maximum frictional tractive force of the locomotive.

The main object of my invention now consists in providing an additional rate of speed for the transmission gearing for this branch $a_2$, said rate of speed being obtained by a still greater ratio of gearing than that which had normally been present for said branch $a_2$. This additional rate of speed will have the effect that the torque required in order to start the locomotive is rendered so large at the idle shaft, that the tractive force at the limit of adhesion will cause a comparatively very small strain imposed upon the coupling. The driving wheels of the locomotive will therefore slide on the rails without, however, doing any injury to any part of the transmission gear and without causing the combustion motor to stop. Sliding of the driving wheels of the locomotive will therefore have the effect of a safety device. From the curve of the tractive forces it may be seen that a ratio of gearing will correspond to the additional rate of speed, said ratio of gearing permitting to employ an adhesive weight of the locomotive which is limited by the curve $a_1$. The tractive forces between $a_1$ and $a_2$, however, are above the limits of sliding of the driving wheels of the locomotive. These tractive forces, therefore, may easily be attained with favorable conditions of friction between the driving wheels and the rails and the coefficient of friction $k$ may eventually be increased up to a value of 0.3. Although a sliding of the driving wheels will take place, this is of no injurious effect, since it will act as a safety device as above indicated. By reason of the greater ratio of gearing and the smaller frictional tractive force connected therewith there will also be an increase of the torque to be transmitted by the coupling, namely about in the ratio which exists between the maximum tractive force $a_2$ and the ideal tractive force $a_1$. In the coupling of the additional rate of speed, therefore, not only the time during which the coupling is in sliding condition will be reduced but also the torques to be transmitted by the coupling. In addition to this, by reason of the very large rate of the additional speed the minimum speed of rotation of the motor will be displaced towards smaller velocities of travel of the locomotive and the times of sliding of the coupling from the point of starting up to synchronism of the two coupling members will be further reduced. This is due to the fact that the coupling member which is driven by the motor will more readily assume the speed of the coupling member which is connected with the driving wheels of the locomotive.

I claim :—

1. Method of operating a combustion motor driven locomotive, which consists in operating a transmission gearing which produces a ratio of gearing at starting of said locomotive, said ratio of gearing being so chosen, that slipping of the driving wheels of the locomotive will take place during starting.

2. In a Diesel-motor locomotive, the combination of a multiple-speed transmission gearing, said gearing comprising a number of speed-gears of which the first speed-gear is of such a transmission ratio that the tractive force of the locomotive effected thereby will be slightly smaller than the adhesive force of said locomotive, and an additional speed-gear having a transmission ratio which is greater than said transmission ratio of said former speed-gear and which would give a tractive force greater than said adhesive force.

3. In a Diesel-motor locomotive, the combination of a multiple-speed transmission gearing, composed of a number of speed-gears having ratios of transmission following a geometrical series, and an additional speed-gear having a larger ratio of transmission than that of the speed gear with the greatest ratio of transmission, the ratio of transmission of said additional speed-gear being outside of said geometrical series and being smaller than that value which would follow in said geometrical series.

4. In a Diesel-motor locomotive, the combination of a normal multiple-speed transmission gearing with an additional starting transmission gearing, said starting gearing having a ratio of transmission which for full load of the motor would produce slipping of the driving wheels during starting of the locomotive.

5. In a Diesel-motor locomotive, the combination of a normal multiple-speed transmission gearing with an additional starting transmission gearing, the ratio of transmission of said starting gearing being substantially greater than that corresponding to the maximum tractive force involved by the normal adhesive force of said locomotive.

In testimony whereof I affix my signature.

WALTHER LINDNER.